United States Patent [19]

Lin et al.

[11] Patent Number: 5,248,716

[45] Date of Patent: Sep. 28, 1993

[54] SILICONE PRESSURE-SENSITIVE ADHESIVES WITH CONTROL REMOVAL PROPERTY

[75] Inventors: Shaow B. Lin, Schenectady; Stuart R. Kerr, III, Troy, both of N.Y.

[73] Assignee: General Electric Company, Waterford, N.Y.

[21] Appl. No.: 828,437

[22] Filed: Jan. 30, 1992

[51] Int. Cl.$^5$ .................. C08K 5/54; C08G 77/04
[52] U.S. Cl. .................. 524/268; 524/267; 525/478; 525/477
[58] Field of Search ............... 524/267, 268; 525/478, 525/477

[56] References Cited

U.S. PATENT DOCUMENTS

| | | | |
|---|---|---|---|
| 3,983,298 | 9/1976 | Hahn et al. | 428/355 |
| 4,016,328 | 4/1977 | Horning | 428/355 |
| 4,465,805 | 8/1984 | Blizzard et al. | 525/478 |
| 4,774,297 | 9/1988 | Murakami et al. | 525/478 |
| 4,831,070 | 5/1989 | McInally et al. | 524/267 |
| 4,882,377 | 11/1989 | Sweet et al. | 524/267 |
| 4,978,696 | 12/1990 | Clark et al. | 523/212 |
| 4,988,779 | 1/1991 | Medford et al. | 525/478 |
| 5,120,810 | 6/1992 | Fujiki et al. | 528/15 |

FOREIGN PATENT DOCUMENTS

| | | |
|---|---|---|
| 0253601 | 1/1988 | European Pat. Off. |
| 0255226 | 2/1988 | European Pat. Off. |
| 0269454 | 6/1988 | European Pat. Off. |
| 0355991 | 2/1990 | European Pat. Off. |
| 0360516 | 3/1990 | European Pat. Off. |
| 0388092 | 9/1990 | European Pat. Off. |

*Primary Examiner*—Melvyn I. Marquis
*Assistant Examiner*—Margaret W. Glass

[57] ABSTRACT

Distortion and haze of pressure sensitive tapes upon removal can be minimized by incorporating a small amount of chemically compatible, high molecular weight silicone polymer release modifier to the curable PSA compositions. Organopolysiloxanes of the general formula:

$$RR^1{}_2SiO(R^1{}_2SiO)_x(RR^2SiO)_ySiR^1{}_2R$$

are used as the release modifier, wherein each $R^1$ and $R^2$ is independently an aryl or alkyl group having from 1 to about 10 carbon atoms, each R is independently chosen from the following groups: $R^1$, $R^2$, alkenyl having from 1 to about 10 carbon atoms, hydrogen, alkoxy (such as methoxy, ethoxy, propoxy, etc.) hydroxy, epoxy, amino, and fluoroalkyl having up to 10 carbon atoms; x and y are each an integer such that the value of $(x+y)$ is sufficient to yield a composition having a viscosity of from at least 1500 cps at room temperature to as high as the viscosity of silicone gums. When compared to similar compositions without the release modifier, a cured silicone PSA with much less distortion, a smoother surface, and clearer optics is obtained upon removal or dispensing.

9 Claims, No Drawings

SILICONE PRESSURE-SENSITIVE ADHESIVES WITH CONTROL REMOVAL PROPERTY

RELATED APPLICATIONS

This application relates to U.S. application Ser. Nos. 07/675,232, 07/675,380 and 07/675,396, filed on Mar. 26, 1991.

BACKGROUND OF THE INVENTION

Solventless and high solids silicone pressure sensitive adhesives provide excellent cure, peel and tack adhesion properties on polyester, polyimide, and polytetrafluoroethylene tapes. However, some cured PSA tapes have a high affinity to the back side of adhesive tapes. This affinity is undesirable since it leads to difficulties in unwinding and slitting operations and inconsistency in tape appearance upon dispensing. This phenomenon is most apparent with adhesives having a polyester backing.

Some specific compositions which are curable to produce pressure sensitive adhesives, display this high affinity to the backside of adhesive tapes. In particular, these compositions include recently developed solventless or low solvent-containing organopolysiloxane compositions which comprise by weight: (A) from about 50 to about 75 parts by weight of a toluene and benzene soluble, resinous copolymer comprising $R_3SiO_{1/2}$ units and $SiO_{4/2}$ units wherein R is a monovalent hydrocarbon radical having from 1 to 6 carbon atoms; (B) an alkenyl-terminated polydiorganosiloxane; (C) an organohydrogenpolysiloxane compatible with the mixture of (A) and (B); (D) a catalytic amount of a hydrosilation catalyst; and (E) from 0 to about 40% by weight of an organic solvent.

Other specific compositions having such high backside affinities include compositions of the type described above which further comprise a hydrogen-containing polydiorganosiloxane containing more than two silicon-bonded hydrogen atoms per chain and being present in an amount such that (D) has a silicon-bonded hydrogen content of from about 10 to about 100 mole % based on the total silicon-bonded hydrogen content of (C) and (D).

When dispensing tapes having compositions of these types, the dispensing angle affects the surface smoothness and optical quality of the removed tapes. When dispensing a polyester-backed silicone adhesive at 180° angle, a substantially clear, smooth undistorted adhesive tape can be obtained. However, at 90°, a more common dispensing angle, a relatively hazy, roughened tape is obtained. To adhesive tape manufacturers and users, it is desirable to have silicone pressure sensitive adhesives which can be dispensed with little caution using available equipment and settings and still obtain a smooth surface and minimal distorted optical characteristics.

Therefore, it is desirable to develop methods and compositions curable to form silicone adhesives with improved resistance to distortion and haze upon removal from a finished tape roll, regardless of the dispensing angle.

SUMMARY OF THE INVENTION

According to the present invention, distortion and haze upon removal can be minimized by incorporating a small amount of chemically compatible, high molecular weight silicone polymer release modifier to the curable PSA compositions discussed above.

When compared to similar compositions without the release modifier, a cured silicone PSA with much less distortion, a smoother surface, and clearer optics is obtained upon removal or dispensing.

According to an embodiment of the present invention, the clean and smooth removal properties of the cured silicone PSA tapes can be adjusted by choosing the type and amount of release modifier in the curable silicone pressure-sensitive compositions.

According to another embodiment of the present invention, a useful control removal additive a) is chemically miscible with curable compositions of MQ resin/hydride systems and vinyl fluids and/or cross-linker, b) has a minimal viscosity of 1500 cps at room temperature or an approximate molecular weight of 30,000, c) does not interfere Pt-catalyzed, addition-cure reaction chemistry, and d) is stable in the cured pressure-sensitive adhesive compounds.

DESCRIPTION OF THE INVENTION

The organopolysiloxanes of the present invention are useful as release modifiers and are effective in compositions suitable for forming a pressure-sensitive adhesive. About 0.5 to 15 weight percent, preferably 2 to 10 weight percent of modifier, based on the amount of curable PSA composition, can be added to these high solids and solventless curable compositions to facilitate an easy and smooth removal from the backside of an adhesive tape. The release modifier minimizes distortion and roughening of the cured silicone PSA surface upon removal (unwinding) or dispensing.

Useful organopolysiloxanes of the present invention have the general formula:

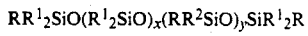

$$RR^1_2SiO(R^1_2SiO)_x(RR^2SiO)_ySiR^1_2R$$

wherein each $R^1$ and $R^2$ is independently an aryl or alkyl group having from 1 to about 10 carbon atoms, each R is independently chosen from the following groups: $R^1$, $R^2$, alkenyl having from 1 to about 10 carbon atoms, hydrogen, alkoxy (such as methoxy, ethoxy, propoxy, etc.) hydroxy, epoxy, amino, and fluorochemicals having up to 10 carbon atoms such as partially or fully fluorinated alkyl, alkenyl, ether or ester groups comprising from 1 to about 8 carbon atoms attaching directly to backbone silicon atoms or attaching indirectly to backbone silicon atoms through an organosiloxane segment containing from 1 to about 10 silicon atoms; x and y are each an integer such that the value of (x+y) is sufficient to yield a composition having a viscosity of from at least 1500 cps at room temperature to as high as the viscosity of silicone gums, preferably a viscosity of 10,000 cps or above. Depending upon the types of R and its presence in the chain, compositions expressed in the above formula can be identified structurally as homopolymers, or copolymers of random, alternating or block chain structures consisting of the repeating units. The compositions should be chemically miscible with the mixture of MQ resin, silicone fluids and polymers as taught in the prior art. One particular example is a silanol-stopped poly(dimethylsiloxane) gum of about 8.6 million cps viscosity which was shown to also be reasonably effective.

This control removal additive organopolysiloxane was found to be effective in compositions as described in the Background of the Invention, particularly those having from about 50 to about 75 parts of a benzenesoluble silicone resin and about 25 to about 50 parts of vinyl- and hydride-containing organopolysiloxanes. The weight percentage of the control removal additive organopolysiloxane is based upon 100 parts by weight of the resin and the vinyl- or hydride-containing organopolysiloxane mixture The compositions further include a Pt-catalyst, and from 0 to 40 weight percent organic solvent.

These organopolysiloxanes were also found to be effective in compositions as described in the Background of the Invention, particularly those curable compositions having relatively low viscosity at high solids or solventless state, for example, a viscosity of 200,000 cps at 25° C. at 94% solid.

The effectiveness of organopolysiloxanes as release modifiers does not depend on a particular type of curing reaction or mechanism leading to useful adhesive matrix, nor does it depend on particular curing conditions such as cure temperature or cure time, so long as a satisfactory cure is achieved. It is not critical whether curing reaction is an addition reaction between silicon hydride and alkenyls of silicones or condensation reactions between silanol group and silicon hydride or among silanol groups contained within.

To better describe "control removal" property and its effect on the appearance of a cured PSA property, a method was developed to describe the optics and the smoothness of adhesive tapes. The compositions below were applied over a 1 mil polyester film and cured to form a 1.5 to 2 mil silicone adhesive layer. Then the cured adhesive film was pressed against a cleaned stainless steel plate using a 4.5 pound rubber roll. After 20 minutes, the tape was removed at 90° and 180° angles, respectively, relative to the plate. The removed adhesive tapes were subjected to a % haze measurement using a Gardener colorimeter. The % haze value of the untested adhesive was also measured and used as a standard. The reported % haze is the difference between the tested value and the standard value, which reflects the net change in % haze due to mechanical dispensing or removal. The lower the value, the less distortion and better removal property of a cured adhesive.

EXAMPLE 1

Preparation of Component Mixtures

High solid's (e.g. 95%) mixtures curable to form silicone pressure-sensitive adhesives were prepared comprising MQ resin having the units $R_3SiO_{1/2}$ (or M) and $SiO_2$ (or Q) at a ratio of about 0.7, and about 2 weight percent of silicon-bonded hydroxy group. Component A comprised 58 weight percent MQ resin and 42 weight percent fluid made by mixing 279 gms of an MQ resin which is 60% solid in 40% toluene by weight, with 121 gms of vinyl-stopped dimethylsilicone (M"$D_{105}$M") fluid, and 0.40 gms of Kardstadt Pt-catalyst (5% Pt).

The mixture was then vacuum stripped to remove toluene solvent to obtain 95% solid or solventless mixture.

Similarly, Component B was made to a weight ratio of 58 weight percent MQ resin to 42 weight percent hydride-stopped $M^HD_{121}M^H$ silicone fluid by mixing 193 gms of the 60% solids MQ resin with 84 gms of the hydride stopped silicone fluid The volatile solvent was then removed through a vacuum stripper at a temperature of 70° C. or less. Then, 1.77 gms of dimethyl maleate inhibitor and 2.77 gms of a methylhydrogen silicone fluid of the approximate structure, $M^HD_{20}D^H{}_3M^H$, having a hydride equivalent weight (HEW) of 625 was added. The resultant Component B had an averaged HEW of 3796.

EXAMPLE 2

Modifier-Free Composition

A composition without having any modifier was prepared by mixing 10.0 gms of Component A, shown in Example 1, with 14.25 gms of Component B, shown in Example 1, along with 0.60 gms of the $M^HD_{121}M^H$ hydride fluid, and 0.6 gms of the M"$D_{105}$M" vinyl fluid. This yielded a weight percent ratio of 55.1 MQ to 44.9 fluids and a SiH to SiVinyl ratio of 1.498.

After thorough mixing, the composition was coated with a wire-wound rod over a clear 1 mil polyester film, then cured for 3 minutes at 150° C. The cured silicone adhesive was 2.0 mil thick and had a Polyken tack adhesion of 616 gms/cm, and a peel adhesion of 33 oz/in against the steel plate. The haze after release at 90° was 24.2%, and 3.0% at 180° removal angle. These values are considered high for adhesive applications requiring good optics and finish.

EXAMPLES 3-5

A dimethylvinyl-stopped polydimethylsiloxane polymer of about 85,000 cps viscosity at room temperature was used as a modifier to the basic composition illustrated in Example 1. For Examples 3 and 4, the basic composition mixture is prepared by mixing 10.0 gms of Component A with 14.25 gms of Component B, both shown in Example 1. To the total solids of the basic composition (as 100 parts) 5.2 and 9.7 parts by weight of the modifier were added, respectively. The final mixture had a SiH (silicon-bonded hydride) to SiV (also known as silicon-bonded vinyl) ratio of about 1.498. The base mixture in Example 5 consisted of 10.0 gms of Component A and 12.38 gms of Component B. In Example 5, 3.75 gms of the high viscosity polymer was added to produce 17.7 parts by weight additive per 100 parts by weight of the mixture of Components A and B. From these mixtures Cured silicone adhesive tapes were made on 1 mil polyester film. The corresponding peel, tack adhesion and removal property, in terms of % haze reading at both 90° and 180° angles are shown in Table 1 below Significant reduction in % haze was obtained from the cured tapes.

TABLE I

| Experiment Number | Viscosity of Modifier | Parts Additive | SiH/SiV Ratio | Weight Percent MQ | Probe Tack gms/cm$^2$ | Peel (Steel) oz/in | Release at 90° % Haze | Release at 180° % Haze |
|---|---|---|---|---|---|---|---|---|
| 2 | 85 M cps | 0 | 1.498 | 55.1 | 616 | 33 | 24.2 | 3 |
| 3 | 85 M cps | 5.2 | 1.498 | 55.1 | 656 | 29 | 0.9 | 0.7 |
| 4 | 85 M cps | 9.7 | 1.498 | 52.9 | 622 | 22 | 1.2 | 0.8 |
| 5 | 85 M cps | 17.7 | 1.3 | 49.3 | 638 | 19 | 7.7 | 1 |

EXAMPLES 6-10

To optimize the viscosity range of useful control removal additives, a series of dimethylhydroxy-stopped polydimethylsiloxanes, of viscosity from 7600 cps to as high as $8.6 \times 10^6$ cps at room temperature were used as modifiers. In Example 6, a composition without modifier was made by mixing 10 g of Component A with 12.38 gms of Component B, both shown in Example 1. Examples 7 through 10 are compositions based on 100 parts by weight of the base composition in Example 6, with 5.6 parts by weight of modifier. Cured silicone pressure-sensitive adhesives were made from each of these compositions, according to the procedure in Example 2. All adhesives showed complete cure and no residue upon testing. The test results are shown in Table II. The modifier-containing adhesives (Examples 7-10) had reasonable peel and tack adhesion and significant less haze at a 90° peel angle than what was observed in Example 6. The % haze readings at 180° peel angle suggest inherent contributions from a particular polyester film and cured adhesive mass.

TABLE II

| Experiment Number | Viscosity of Modifier | Parts Additive | SiH/SiV Ratio | Weight Percent MQ | Probe Tack gms/cm² | Peel (Steel) oz/in | Release at 90° % Haze | Release at 180° % Haze |
|---|---|---|---|---|---|---|---|---|
| 6 |  | 0 | 1.3 | 58 | 704 | 40 | 8.5 | 1.9 |
| 7 | 7600 cps | 5.6 | 1.3 | 54.9 | 632 | 26 | 3.2 | 2.1 |
| 8 | 30 M cps | 5.6 | 1.3 | 54.9 | 676 | 26 | 3.5 | 1.8 |
| 9 | 130 M cps | 5.6 | 1.3 | 54.9 | 684 | 25 | 4.6 | 2.5 |
| 10 | 8.59 MM cps | 5.6 | 1.3 | 54.9 | 770 | 32 | 5.9 | 2.6 |

EXAMPLE 11

Epoxy-Containing Silicon Polymer

A silicone polymer containing epoxide (cyclohexeneoxide as derived from the reaction product of vinylcyclohexeneoxide with siliconhydride) with a viscosity of 1680 cps was used at a ratio of 5.6 parts by weight to a 100 parts by weight solid of the base composition of Example 6. A completely cured pressure-sensitive adhesive tape of 1.8 mil thickness was obtained. The peel adhesion was 23 oz/in, Polyken tack was 690 gms/cm,, and a haze value of 7.3% was obtained at 90° removal angle. As compared to a reading of 8.5% for Example 6, silicone modifier of 1600 cps showed some improvement over the one without any modifier in terms of minimizing surface and optics distortion.

EXAMPLES 12-14

Alkyl-Terminated Silicone Polymers

To illustrate the option of using alkyl-stopped silicone polymers (up to 18 carbon atoms) as release modifiers, a polydimethylsiloxane polymer of 100,000 cps viscosity was used at 0.99, 2.8, and 5.6 parts by weight per 100 parts by weight solid of the base composition in Example 6. All compositions were cured to yield residue-free, silicone adhesives with improved removal property. The effect in reducing the % haze was observed at as low as 1 part by weight additive per 100 parts by weight solid of the base composition in Example 6. Table III below shows the properties of these compositions.

TABLE III

| Experiment Number | Viscosity of Modifier | Parts Additive | SiH/SiV Ratio | Weight Percent MQ | Probe Tack gms/cm² | Peel (Steel) oz/in | Release at 90° % Haze | Release at 180° % Haze |
|---|---|---|---|---|---|---|---|---|
| 12 | 100 M cps | 0.99 | 1.3 | 57.4 | 686 | 37 | 6.1 | 2.2 |
| 13 | 100 M cps | 2.8 | 1.3 | 56.4 | 636 | 26 | 1.8 | 1 |
| 14 | 100 M cps | 5.6 | 1.3 | 54.9 | 644 | 22 | 4.4 | 0.2 |

EXAMPLES 15-16

Fluorosilicone Polymers

The effects of the partial miscibility of the release modifier with the base composition of MQ resin, silicone fluids and/or polymers and Pt-catalyst is shown in these Examples 15 and 16. The effectiveness of the modifier in reducing the % haze or surface distortion associated with removal or dispensing is greatly reduced without at least partial miscibility. In Example 15, a dimethylhydroxy-stopped fluorosilicone polymer of 100,000 cps viscosity was used at 5.6 parts by weight per 100 parts by weight of the base composition. In Example 16, a vinyl-stopped copolymer of dimethyl silicone and trifluoropropylmethylsilicone of 29,000 cps was used at 5.6 parts by weight per 100 parts by weight of the base composition. The % haze of 90° angle peeled tapes had readings of 9.4 and 12.5, respectively. The higher % haze in Example 16 was the result of less chemical miscibility with the base material before cure.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A pressure sensitive adhesive, having improved control removal properties, said adhesive comprising a resin/organopolysiloxane composition curable to produce a pressure sensitive adhesive said organopolysiloxane composition curable to produce a pressure sensitive adhesive comprising about 50 to about 75 parts by weight of a benzene toluene-soluble siloxane resin, about 25 to about 50 parts by weight of vinyl-and hydride-containing organopolysiloxanes, a Pt catalyst, and from 0 to about 40 weight percent organic solvent and from about 0.5 to about 15 weight percent based upon the resin/organopolysiloxane composition of a chemically compatible high molecular weight organopolysiloxane having the general formula:

$$RR^1{}_xSiO(R^1{}_2SiO)_x(RR^2SiO)_ySiR^1{}_2R \qquad (1)$$

wherein each $R^1$ is independently an alkyl or aryl group having from 1 to about 10 carbon atoms, each $R^2$ is independently an alkyl or aryl group having from 1 to about 10 carbon atoms, each R is independently chosen from $R^1$ or $R^2$, x is an integer, and y is an integer, x and y having values such that the chain-length dependent viscosity of the chemically compatible high molecular weight polyorganosiloxane is at least 1500 cps at 25° C.

2. A pressure sensitive adhesive as in claim 1, wherein said chemically compatible high molecular weight organopolysiloxane is present in an amount of between 2 and 10 weight percent.

3. A pressure sensitive adhesive as in claim 1, wherein x and y are such that the chain-length dependent viscosity of said chemically compatible high molecular weight organopolysiloxane is at least 7600 cps at 25° C.

4. A pressure sensitive adhesive as in claim 1, wherein x and y are such that the chain-length dependent viscosity of said chemically compatible high molecular weight organopolysiloxane is at least 10,000 cps at 25° C.

5. A pressure sensitive adhesive as in claim 1, wherein x and y are such that the chain-length dependent viscosity of said chemically compatible high molecular weight organopolysiloxane is at least about 85,000 cps at 25° C.

6. A pressure sensitive adhesive as in claim 1, wherein said chemically compatible high molecular weight organopolysiloxane comprises an alkyl-terminated silicone polymer.

7. A pressure sensitive adhesive as in claim 6, wherein said chemically compatible high molecular weight organopolysiloxane comprises a polydimethylsiloxane.

8. A pressure sensitive adhesive as in claim 7, wherein said polydimethylsiloxane has a viscosity of from about 7600 cps to about 8,600,000 cps at room temperature.

9. A pressure sensitive adhesive as in claim 6, wherein said alkyl-terminated silicone polymer is present in an amount of between 2 parts by weight and 10 parts by weight based on 100 parts by weight of the organopolysiloxane composition curable to produce a pressure sensitive adhesive.

* * * * *